US009775178B2

(12) United States Patent
Chun et al.

(10) Patent No.: US 9,775,178 B2
(45) Date of Patent: *Sep. 26, 2017

(54) METHOD OF HANDLING TIME ALIGNMENT COMMAND DURING A RANDOM ACCESS PROCEDURE

(71) Applicant: LG Electronics Inc., Seoul (KR)

(72) Inventors: Sung-Duck Chun, Anyang-si (KR); Seung-June Yi, Anyang-si (KR); Sung-Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,545

(22) Filed: Jan. 6, 2017

(65) Prior Publication Data
US 2017/0118777 A1    Apr. 27, 2017

Related U.S. Application Data

(63) Continuation of application No. 15/216,490, filed on Jul. 21, 2016, now Pat. No. 9,565,703, which is a
(Continued)

(51) Int. Cl.
*H04J 3/00* (2006.01)
*H04W 74/08* (2009.01)
(Continued)

(52) U.S. Cl.
CPC ....... *H04W 74/0833* (2013.01); *H04L 5/0078* (2013.01); *H04W 56/001* (2013.01);
(Continued)

(58) Field of Classification Search
USPC .................. 370/328–331, 338; 455/436, 450
See application file for complete search history.

(56) References Cited

U.S. PATENT DOCUMENTS

2008/0096563 A1    4/2008    Fischer et al.
2008/0310396 A1    12/2008    Park et al.

FOREIGN PATENT DOCUMENTS

CN    101316134        12/2008
CN    101316134 A      12/2008
(Continued)

OTHER PUBLICATIONS ("3rd Generation Partnership Project; Technical Specification Group Radio Access Network; Evolved Universal Terrestrial Radio Access (E-UTRA) Medium Access Control (MAC) protocol specification (Release 8)"; 3GPP TS 36.321 V8.0.0; Dec. 2007).*
(Continued)

*Primary Examiner* — Afshawn Towfighi
(74) *Attorney, Agent, or Firm* — Dentons US LLP

(57) ABSTRACT

Disclosed is the radio (wireless) communication system providing a radio communication service and the terminal, and more particularly, a method of handling time alignment command during a random access procedure in an Evolved Universal Mobile Telecommunications System (E-UMTS) evolved from the Universal Mobile Telecommunications System (UMTS) or a Long Term Evolution (LTE) system is provided.

11 Claims, 6 Drawing Sheets

Related U.S. Application Data continuation of application No. 14/668,499, filed on Mar. 25, 2015, now Pat. No. 9,426,830, which is a continuation of application No. 14/079,331, filed on Nov. 13, 2013, now Pat. No. 9,014,180, which is a continuation of application No. 12/654,895, filed on Jan. 7, 2010, now Pat. No. 8,665,838.

(60) Provisional application No. 61/143,392, filed on Jan. 8, 2009.

(51) Int. Cl.
*H04W 56/00* (2009.01)
*H04W 72/04* (2009.01)
*H04W 74/00* (2009.01)
*H04L 5/00* (2006.01)
*H04W 88/02* (2009.01)

(52) U.S. Cl.
CPC ..... *H04W 72/0446* (2013.01); *H04W 74/006* (2013.01); *H04W 88/02* (2013.01)

(56) References Cited

FOREIGN PATENT DOCUMENTS

| KR | 10-2008-0111407 | 12/2008 |
| KR | 10-2008-0111407 A | 12/2008 |

OTHER PUBLICATIONS

R2-091359: 3GPP-TSG-RAN2 Meeting #65, Athens, Greece, Feb. 9-13, 2009, "Correction to Rach" LG Electronics Inc.

R2-091647: 3GPP-TSG-RAN-WG2 Meeting 365, Athens, Greece, Feb. 9-13, 2009, "Clarification on Random Access Procedure" ASUSTek, ITRI, LG Electronics Inc., NTT DoCoMo Inc., Samsung.

3GPP TS 36.321 V8.4.0: "3rd Generation Partnership Project; Technical Specification Group Radio Access Network; Evolved Universal Terrestrial Radio Access (E-Utra) Medium Access Control (MAC) protocol specification" Release 8, pp. 1-43.

("3rd Generation Partnership Project; Technical Specification Group Radio Access Network; Evolved Universal Terrestrial Radio Access (E-UTRA) Medium Access Control (MAC) protocol specification (Release 8)"; 3GPP TS 36.321 v8.4.0; Dec. 2008).

"Clarification on Random Access Procedure"—AsusteK et al.— 3GPP TSG-RAN WG2 Meeting #65, R2-091647—Change Request 36.321 CR_0308, Version 8.4.0—Athens, Greece, Feb. 12, 2009 (Feb. 12, 2009).

"3rd Generation Partnership Project; Technical Specification Group Radio Access Network; Evolved Universal Terrestrial Radio Access (E-UTRA) Medium Access Control (MAC) protocol specification (Release 8)." 3GPP Organizational Partners; v8.4.0; France; (Dec. 2008).

LG Electronics Inc: "Correction to RACH", 3GPP Draft; R2-091359 Proposed CR to 36.321 on Correction to RACH, 3rd Generation Partnership Project (3GPP), Mobile Competence Centre; 650, Route Des Lucioles; F-06921 Sophia-Antipolis Cedex; France, no. Athens, Greece; Feb. 3, 2009, Feb. 3, 2009 (Feb. 3, 2009), XP050323381.

Asutek et al.: "Clarification on Random Access Procedure", 3GPP Draft; 36321 CR0308-(REL-8)_R2-091647 on Clarification of RA Procedure, 3rd Generation Partnership Project (3GPP), Mobile Competence Centre; 650, Route Des Lucioles; F-06921 Sophia-Antipolis Cedex; France, no. Athens, Greece; Feb. 12, 2009, Feb. 12, 2009 (Feb. 12, 2009), XP050322995.

"3rd Generation Partnership Project; Technical Specification Group Radio Access Network; Evolved Universal Terrestrial Radio Access (E-UTRA) Medium Access Control (MAC) protocol specification (Release 8)", 3GPP Standard; 3GPP TS 36.321, 3rd Generation Partnership Project (3GPP), Mobile Competence Centre; 650, Route Des Lucioles; F-06921 Sophia-Antipolis Cedex; France, No. V8.4.0, Dec. 1, 2008 (Dec. 1, 2008), pp. 1-40, XP050377620.

(3rd Generation Partnership Project; Technical Specification Group Radio Access Network; Evolved Universal Terrestrial Radio Access (E-UTRA) Medium Access Control (MAC) protocol specification (Release 8); 3GPP TS 36.321 v8.4.0; Dec. 2008).

\* cited by examiner

METHOD OF HANDLING TIME ALIGNMENT COMMAND DURING A RANDOM ACCESS PROCEDURE

RELATED APPLICATION

This is a continuation of U.S. patent application Ser. No. 15/216,490, filed on Jul. 21, 2016, now allowed, which is a continuation of U.S. application Ser. No. 14/668,499 filed Mar. 25, 2015, now U.S. Pat. No. 9,426,830, which is a continuation of U.S. patent application Ser. No. 14/079,331 filed Nov. 13, 2013, now U.S. Pat. No. 9,014,180, which is a continuation of U.S. patent application Ser. No. 12/654,895 filed Jan. 7, 2010, now U.S. Pat. No. 8,665,838, which claims priority and benefit from U.S. Provisional Application No. 61/143,392, filed on Jan. 8, 2009, all of which are herein expressly incorporated by reference in their entirety.

TECHNICAL FIELD

The present invention relates to a radio (wireless) communication system providing a radio communication service and a terminal, and more particularly, to a method of handling time alignment command (TAC) during a random access procedure (or process) in an Evolved Universal Mobile Telecommunications System (E-UMTS) or a Long Term Evolution (LTE) system.

BACKGROUND ART

FIG. 1 shows an exemplary network structure of an Evolved Universal Mobile Telecommunications System (E-UMTS) as a mobile communication system to which a related art and the present invention are applied. The E-UMTS system is a system that has evolved from the existing UMTS system, and its standardization work is currently being performed by the 3GPP standards organization. The E-UMTS system can also be referred to as a LTE (Long-Term Evolution) system.

The E-UMTS network can roughly be divided into an E-UTRAN and a Core Network (CN). The E-UTRAN generally comprises a terminal (i.e., User Equipment (UE)), a base station (i.e., eNode B), an Access Gateway (AG) that is located at an end of the E-UMTS network and connects with one or more external networks. The AG may be divided into a part for processing user traffic and a part for handling control traffic. Here, an AG for processing new user traffic and an AG for processing control traffic can be communicated with each other by using a new interface. One eNode B may have one or more cells. An interface for transmitting the user traffic or the control traffic may be used among the eNode Bs. The CN may comprise an AG, nodes for user registration of other UEs, and the like. An interface may be used to distinguish the E-UTRAN and the CN from each other.

The various layers of the radio interface protocol between the mobile terminal and the network may be divided into a layer 1 (L1), a layer 2 (L2) and a layer 3 (L3), based upon the lower three layers of the Open System Interconnection (OSI) standard model that is well-known in the field of communications systems. Among these layers, Layer 1 (L1), namely, the physical layer, provides an information transfer service to an upper layer by using a physical channel, while a Radio Resource Control (RRC) layer located in the lowermost portion of the Layer 3 (L3) performs the function of controlling radio resources between the terminal and the network. To do so, the RRC layer exchanges RRC messages between the terminal and the network. The RRC layer may be located by being distributed in network nodes such as the eNode B, the AG, and the like, or may be located only in the eNode B or the AG.

FIG. 2 shows exemplary control plane architecture of a radio interface protocol between a terminal and a UTRAN (UMTS Terrestrial Radio Access Network) according to the 3GPP radio access network standard. The radio interface protocol as shown in FIG. 2 is horizontally comprised of a physical layer, a data link layer, and a network layer, and vertically comprised of a user plane for transmitting user data and a control plane for transferring control signaling. The protocol layer in FIG. 2 may be divided into L1 (Layer 1), L2 (Layer 2), and L3 (Layer 3) based upon the lower three layers of the Open System Interconnection (OSI) standards model that is widely known in the field of communication systems.

Hereinafter, particular layers of the radio protocol control plane of FIG. 2 and of the radio protocol user plane of FIG. 3 will be described below.

The physical layer (Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The Medium Access Control (MAC) layer of Layer 2 provides services to a radio link control (RLC) layer (which is a higher layer) via a logical channel. The RLC layer of Layer 2 supports the transmission of data with reliability. It should be noted that if the RLC functions are implemented in and performed by the MAC layer, the RLC layer itself may not need to exist. The PDCP layer of Layer 2 performs a header compression function that reduces unnecessary control information such that data being transmitted by employing Internet Protocol (IP) packets, such as IPv4 or IPv6, can be efficiently sent over a radio interface that has a relatively small bandwidth.

The Radio Resource Control (RRC) layer located at the lowermost portion of Layer 3 is only defined in the control plane, and handles the control of logical channels, transport channels, and physical channels with respect to the configuration, re-configuration and release of radio bearers (RB). Here, the RB refers to a service that is provided by Layer 2 for data transfer between the mobile terminal and the UTRAN.

Description of a RRC connection reconfiguration will be given. In general, when the RRC connection is established between a terminal and a network (base station), the network provides any necessary parameter(s) and their value(s) to the terminal so as to perform data communication with the terminal. Using theses parameter(s) and their values, the terminal may be notified that which logical channel is configured, an identity or identity number for each logical channel, or setting value for timers. During a call, if these parameters and their parameter values are needed to be changed, the network is able to provide new parameter(s) and their value to the terminal using a RRC connection reconfiguration message. In this case, the terminal usually applies or uses these new parameters immediately after receiving the RRC connection reconfiguration message.

Description of an uplink timing alignment maintenance in a LTE system will be given. In the LTE system that based on an Orthogonal Frequency Division Multiplex (OFDM) technology, there is possibility of interferences between terminals (UEs) during a communication between UE and base station (eNB). In order to minimize interferences between terminals, it is important that the base station must manage or handle a transmission timing of the UE. More particularly, the terminal may exist in random area within a cell, and this implies that a data transmission time (i.e., traveling time of data from UE to base station) can be varied based on a location of the terminal. Namely, if the terminal is camped on edge of the cell, data transmission time of this specific terminal will be much longer than data transmission time of those terminals who camped on a center of the cell. In contrast, if the terminal is camped on the center of the cell, data transmission time of this specific terminal will be much shorter than data transmission time of those terminals who camped on the edge of the cell. The base station (eNB) must manage or handle all data or signals, which are transmitted by the terminals within the cell, in order to prevent the Interferences between the terminals. Namely, the base station must adjust or manage a transmission timing of the terminals upon each terminal's condition, and such adjustment can be called as the timing alignment maintenance. One of the methods for maintaining the timing alignment is a random access procedure. Namely, during the random access procedure, the base station receives a random access preamble transmitted from the terminal, and the base station can calculate a time alignment (Sync) value using the received random access preamble, where the time alignment value is to adjust (i.e., faster or slower) a data transmission timing of the terminal. The calculated time alignment value can be notified to the terminal by a random access response, and the terminal can update the data transmission timing based on the calculated time alignment value. In other method, the base station may receive a sounding reference symbol (SRS) transmitted from the terminal periodically or randomly, the base station may calculate the time alignment (Sync) value based on the SRS, and the terminal may update the data transmission timing according to the calculated time alignment value.

As explained above, the base station (eNB) may measure a transmission timing of the terminal though a random access preamble or SRS, and may notify an adjustable timing value to the terminal. Here, the time alignment (Sync) value (i.e., the adjustable timing value) can be called as a time advance command (referred as 'TAC' hereafter). The TAC may be process in a MAC (Medium Access control) layer. Since the terminal does not camps on a fixed location, the transmission timing is frequently changed based on a terminal's moving location and/or a terminal's moving velocity. Concerning with this, if the terminal receives the time advance command (TAC) from the base station, the terminal expect that the time advance command is only valid for certain time duration. A time alignment timer (TAT) is used for indicating or representing the certain time duration. As such, the time alignment timer (TAT) is started when the terminal receives the TAC (time advance command) from the base station. The TAT value is transmitted to the terminal (UE) through a RRC (Radio Resource Control) signal such as system information (SI) or a radio bearer reconfiguration. Also, if the terminal receives a new TAC from the base station during an operation of the TAT, the TAT is restarted. Further, the terminal does not transmit any other uplink data or control signal (e.g., data on physical uplink shared channel (PUSCH), control signal on Physical uplink control channel (PUCCH) except for the random access preamble when the TAT is expired or not running.

In general, a terminal (or UE) may perform a random access procedure in the following cases: 1) when the terminal performs an initial access because there is no RRC Connection with a base station (or eNB), 2) when the terminal initially accesses to a target cell in a handover procedure, 3) when it is requested by a command of a base station, 4) when there is uplink data transmission in a situation where uplink time synchronization is not aligned or where a specific radio resource used for requesting radio resources is not allocated, and 5) when a recovery procedure is performed in case of a radio link failure or a handover failure.

In the LTE system, the base station allocates a dedicated random access preamble to a specific terminal, and the terminal performs a non-contention random access procedure which performs a random access procedure with the random access preamble. In other words, there are two procedures in selecting the random access preamble: one is a contention based random access procedure in which the terminal randomly selects one within a specific group for use, another is a non-contention based random access procedure in which the terminal uses a random access preamble allocated only to a specific terminal by the base station. The difference between the two random access procedures is that whether or not a collision problem due to contention occurs, as described later. And, the non-contention based random access procedure may be used, as described above, only in the handover procedure or when it is requested by the command of the base station.

According to the non-contention based random access procedure of a conventional art, if the terminal receives a time alignment command, the terminal reconfigures an uplink synchronization by using the received time alignment command. However, even with the non-contention based random access procedure, there is a certain case that a preamble, which selected by a base station, can be commonly used by a plurality of different terminals. Therefore, in some case, the received time alignment command may cause to break uplink synchronization, and may create signal interference(s) within a cell due to an unnecessary uplink transmission of TAC.

DISCLOSURE OF THE INVENTION

Therefore, an object of the present invention is to provide a method of handling a time alignment command during a random access procedure in a wireless communication system. More particularly, according to the present invention, a terminal selectively applies an uplink synchronizing alignment command (i.e., TAC) according to a type of the random access procedure, thereby managing a uplink synchronization without wasting of any unnecessary radio resource(s).

To achieve this and other advantages and in accordance with the purpose of the present invention, as embodied and broadly described herein, there is provided a method of performing a random access procedure by a terminal in wireless communication system, the method comprising: receiving a command for starting a timer; determining whether a random access preamble transmitted in the random access procedure is not selected by a terminal; and starting or restating the timer if it is determined that the random access preamble is not selected by the terminal.

To achieve this and other advantages and in accordance with the purpose of the present invention, as embodied and broadly described herein, there is also provided a method of performing a random access procedure by a terminal in wireless communication system, the method comprising:

receiving information related to a random access preamble from a network; transmitting a random access preamble to the network; receiving a command for starting a timer; determining whether the random access preamble transmitted in the random access procedure is selected by a network; and starting or restating the timer if it is determined that the random access preamble is selected by the network.

MODES FOR CARRYING OUT THE PREFERRED EMBODIMENTS

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

Figure 1:
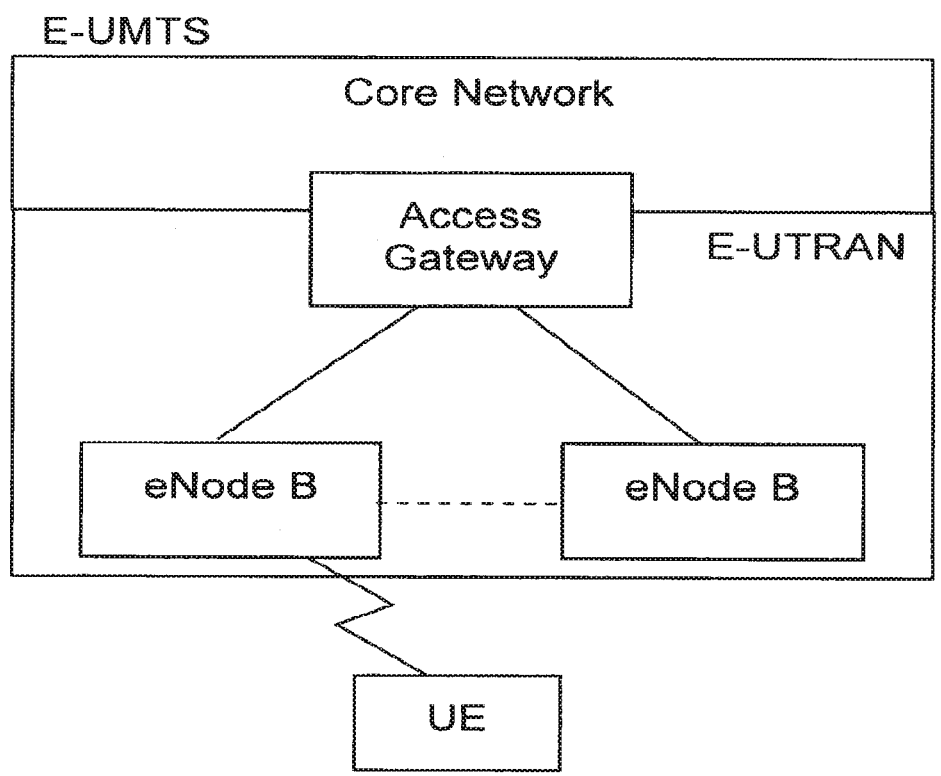
FIG. 1 shows an exemplary network structure of an Evolved Universal Mobile Telecommunications System (E-UMTS) as a mobile communication system to which a related art and the present invention are applied.
Figure 2:
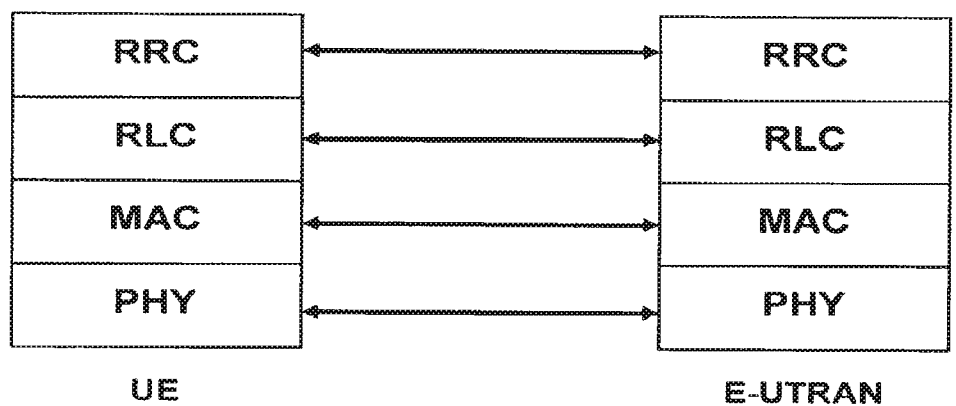
FIG. 2 shows an exemplary view of related art control plane architecture of a radio interface protocol between a terminal and an E-UTRAN.
Figure 3:
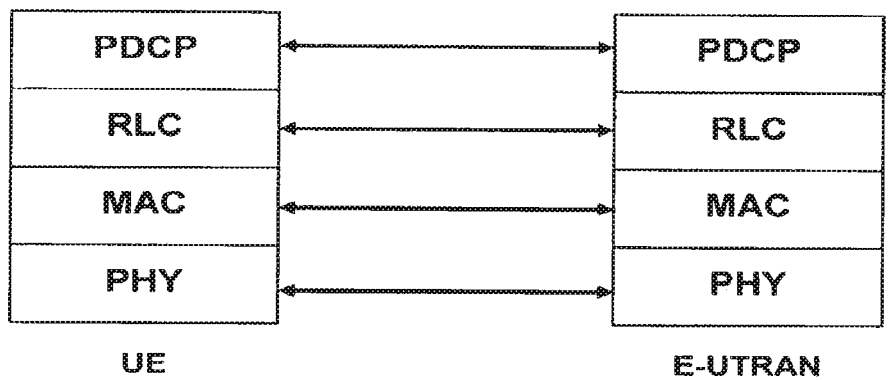
FIG. 3 shows an exemplary view of related art user plane architecture of a radio interface protocol between a terminal and an E-UTRAN.
Figure 4:
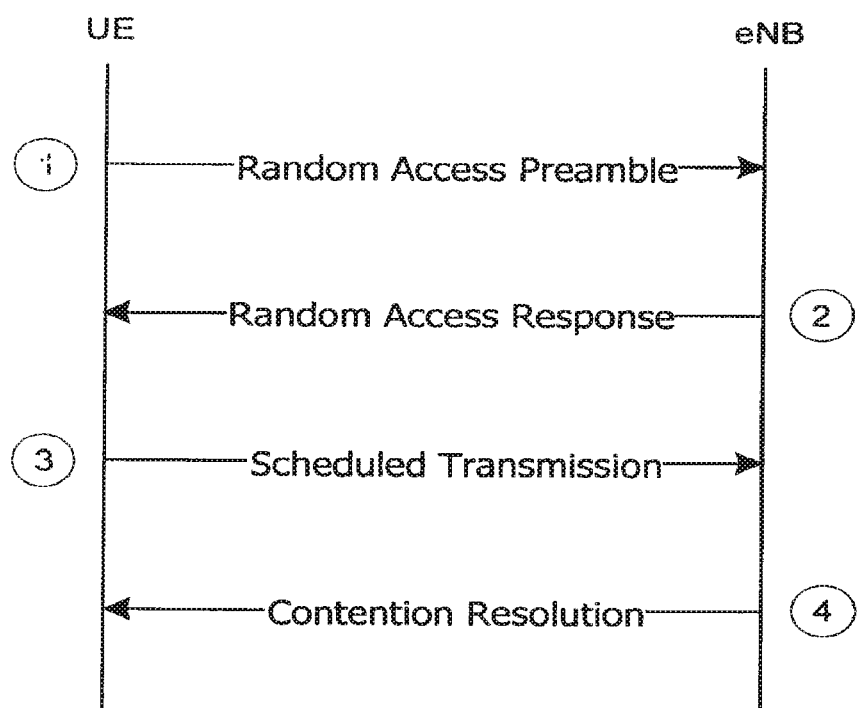
FIG. 4 shows an exemplary view of a contention based random access procedure.

FIG. 4 shows an operation procedure between a terminal and a base station in a contention based random access procedure.

First, a terminal in the contention based random access randomly may select a random access preamble within a group of random access preambles Indicated through system information or a handover command, may select PRACH resources capable of transmitting the random access preamble, and then may transmit the selected random access preamble to a base station (Step 1).

After transmitting the random access preamble, the terminal may attempt to receive a response with respect to its random access preamble within a random access response reception window indicated through the system information or the handover command (Step 2). More specifically, the random access response information is transmitted in a form of MAC PDU, and the MAC PDU may be transferred on the Physical Downlink Shared Channel (PDSCH). In addition, the Physical Downlink Control Channel (PDCCH) is also transferred such that the terminal appropriately receives information transferred on the PDSCH. That is, the PDCCH may include information about a terminal that should receive the PDSCH, frequency and time information of radio resources of the PDSCH, a transfer format of the PDSCH, and the like. Here, if the PDCCH has been successfully received, the terminal may appropriately receive the random access response transmitted on the PDSCH according to information of the PDCCH. The random access response may include a random access preamble identifier (ID), an UL Grant, a temporary C-RNTI, a Time Alignment Command, and the like. Here, the random access preamble identifier is included in the random access response in order to notify terminals to which information such as the UL Grant, the temporary C-RNTI, and the Time Alignment Command would be valid (available, effective) because one random access response may include random access response information for one or more terminals. Here, the random access preamble identifier may be identical to the random access preamble selected by the terminal in Step 1.

If the terminal has received the random access response valid to the terminal itself, the terminal may process each of the information included in the random access response. That is, the terminal stores the temporary C-RNTI. In addition, the terminal uses the UL Grant so as to transmit data stored in a buffer of the terminal or newly generated data to the base station (Step 3). Here, a terminal identifier should be essentially included in the data which is included in the UL Grant (message 3). This is because, in the contention based random access procedure, the base station may not determine which terminals are performing the random access procedure, but later the terminals should be identified for contention resolution. Here, two different schemes may be provided to include the terminal identifier. A first scheme is to transmit the terminal's cell identifier through the UL Grant if the terminal has already received a valid cell identifier allocated in a corresponding cell prior to the random access procedure. Conversely, the second scheme is to transmit the terminal's unique identifier (e.g., S-TMSI or random ID) if the terminal has not received a valid cell identifier prior to the random access procedure. In general, the unique identifier is longer than the cell identifier. In Step 3, if the terminal has transmitted data through the UL Grant, the terminal starts the contention resolution timer.

After transmitting the data with its identifier through the UL Grant included in the random access response, the terminal waits for an indication (instruction) of the base station for the contention resolution. That is, the terminal attempts to receive the PDCCH so as to receive a specific message (Step 4). Here, there are two schemes to receive the PDCCH. As described above, if the terminal identifier transmitted via the UL Grant is the cell Identifier, the terminal attempts to receive the PDCCH by using its own cell identifier. If the terminal identifier transmitted via the UL Grant is its unique identifier, the terminal attempts to receive the PDCCH by using the temporary C-RNTI included in the random access response. Thereafter, for the former, if the PDCCH (message 4) is received through its cell identifier before the contention resolution timer is expired, the terminal determines that the random access procedure has been successfully (normally) performed, thus to complete the random access procedure. For the latter, if the PDCCH is received through the temporary cell identifier before the contention resolution timer is expired, the terminal checks data (message 4) transferred by the PDSCH that the PDCCH indicates. If the unique identifier of the terminal is included in the data, the terminal determines that the random access procedure has been successfully (normally) performed, thus to complete the random access procedure.

Figure 5:
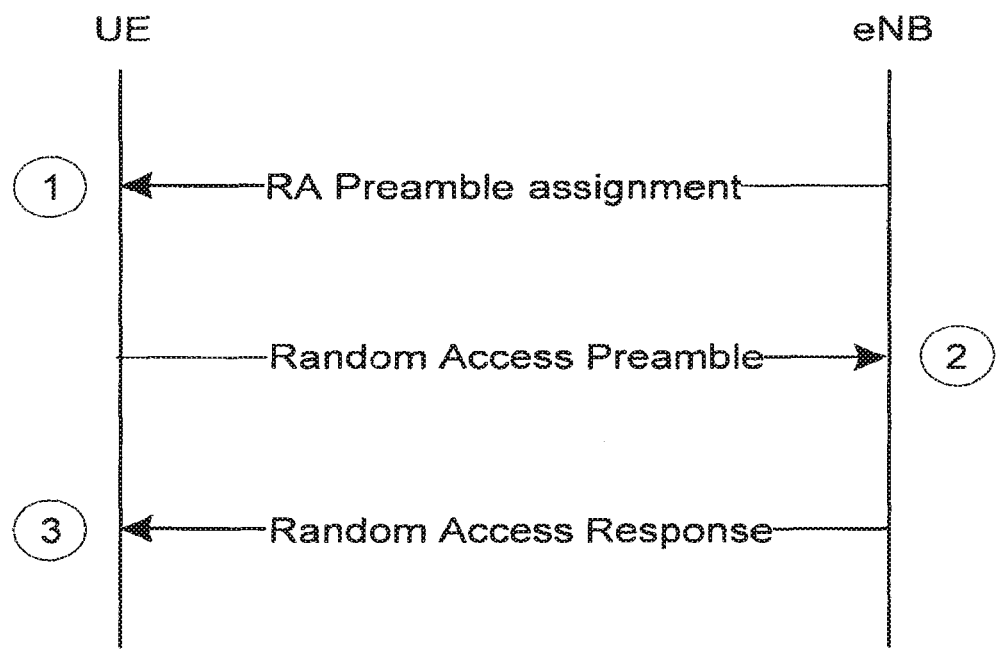
FIG. 5 shows an exemplary view of a non-contention based random access procedure.

FIG. 5 shows an operation procedure between a terminal and a base station in a non-contention based random access procedure. As compared with the contention based random access procedure, the random access procedure is determined to be successfully performed by receiving the random access response information in the non-contention based random access procedure, thus to complete the random access process.

In general, the non-contention based random access procedure may be performed in the following two cases: one is the handover procedure, and the other is a request by the command of the base station. To be certain, the contention based random access procedure may also be performed in those two cases. First, for the non-contention based random access procedure, it is important to receive, from the base station, a dedicated random access preamble without having any possibility of contention. Here, a handover command and a PDCCH command may be used to assign the random access preamble. Then, after the random access preamble dedicated to only the terminal itself has been assigned from the base station, the terminal transmits the preamble to the base station. Thereafter, the method for receiving the random access response information is the same as that in the above-described contention based random access procedure.

The aforementioned non-contention based random access procedure is initialized as the base station indicates the terminal to start the non-contention based random access procedure. In this case, the base station selects a specific preamble that will be used throughout the random access procedure, and directly notifies the specific preamble to the terminal. For example, if the base station notifies the terminal to use a random access preamble identity number 4 (i.e., RAPID=4), the terminal may perform the non-contention random access procedure using a specific preamble corresponding to the RAPID equals to 4.

The description of a time synchronization operation for an uplink transmission will be given as following.

When the terminal (or User equipment) receives a timing advance command MAC (medium access control) element, the received timing advance command may be applied by the terminal. Namely, the terminal may stat the time alignment timer (TAT) (if the TAT is not running) or may restart the time alignment timer (if the TAT is already running).

When the terminal receives a timing advance command in a random access response message, if a random access preamble and physical random access channel (PRACH) resource were explicitly signaled, then the terminal may apply the timing advance command, then the terminal may start the time alignment timer (if the TAT is no running) or may restart the time alignment timer (if the TAT is already running), if the random access preamble and PRACH resource were not explicitly signaled and if the time alignment timer is not running or has expired, then the terminal may apply the timing advance command, and may start the time alignment timer, when a contention resolution is considered not successfully, the terminal may stop the time alignment timer, in other case except for the above, the terminal may ignore the received timing advance command.

The above description of the time synchronization operation for the uplink transmission can be represented by a following text procedure:
The UE Shall:
  when a Timing Advance Command MAC control element is received:
    apply the Timing Advance Command;
    start the Time Alignment Timer (if not running) or restart the Time Alignment Timer (if already running).
  when a Timing Advance Command is received in a Random Access Response message:
    if the Random Access Preamble and PRACH resource were explicitly signalled:
      apply the Timing Advance Command;
      start the Time Alignment Timer (if not running) or restart the Time Alignment Timer (if already running).
    else, if the Time Alignment Timer Is not running or has expired:
      apply the Timing Advance Command;
      start the Time Alignment Timer;
      when the contention resolution is considered not successful, stop the Time Alignment Timer.
    else:
      ignore the received Timing Advance Command.
  when the Time Alignment Timer has expired or is not running:
    prior to any UL-SCH transmission, use the Random Access procedure in order to obtain uplink Time Alignment.
  when the Time Alignment Timer expires:
    flush all HARQ buffers and consider the next transmission for each process as the very first transmission;
    notify RRC of PUCCH/SRS release;
      clear any configured downlink assignments and uplink grants.

As mentioned above, during a non-contention random access procedure, a one-to-one mapping is existed between a terminal and a preamble. Accordingly, if the base station receives a specific preamble, which was assigned to a particular terminal, the base station may automatically realize that the specific preamble is transmitted from the particular terminal. Further, since the specific preamble is definitely transmitted from the particular terminal, the base station may transmit a time alignment command to the particular terminal by checking a time synchronization of the received preamble. Here, the terminal, which receives the time alignment command (TAC), may adjust its own synchronization of uplink direction using the received TAC, and may start a time alignment timer (TAT).

In contrast, during a contention random access procedure, a one-to-N mapping is existed between a specific preamble and a plurality of terminals using the specific preamble. Accordingly, if the base station receives a certain preamble, which was not specifically assigned to a particular terminal, the base station can not possible know which particular terminal transmits the certain preamble. In this case, when the base station transmits a time alignment command (TAC) to a plurality of terminals by checking a time synchronization of the received preamble, the time alignment command (TAC) may be transmitted to more than one particular terminals. Accordingly, in this specific case, the terminal should not apply the received time alignment command.

However, when the random access procedure is initiated by a base station, for example, the base station may order the terminal to start the random access procedure by using a PDCCH command, in most case, the base station selects a particular preamble, and transmits it to the terminal such that the particular preamble can be used throughout the random access procedure. In current LTE system, a total number of preambles that can be used in the random access procedure is 64. Among these preambles, some of preambles may be allocated or assigned for a non-contention based random access procedure, and rest of preambles may be allocated or assigned for a contention based random access procedure. In a certain cell, if there is a plurality of terminals existed in the certain cell and the plurality of terminals actively perform the random access procedure, available number of preamble that can be used by the base station will be very restricted. For example, if there is so many terminals existed in a cell, in some case, even if the base station has to order the terminal to start the random access procedure, the base station may not have any available preamble for the non-contention based random access procedure, and the delay of the random access procedure happens. Because of such delay, a quality of call such as data transmission delay or a packet loss, can be caused. In order to solve this, a random access preamble 0, which is RAPID=00000, can be utilized. For example, if the terminal receives a PDCCH command with RAPID=00000, instead of using any assigned the preamble by the base station, the terminal rather selects one preamble among preambles allocated for the contention based random access procedure. Namely, in case that the terminal receives the random access preamble 0 from the base station, a preamble used for the random access procedure will be selected by the terminal. Therefore, since the preamble is eventually selected by the terminal, even if the initial random access preamble (i.e., random access preamble 0) was provided by the base station, the preamble selected by the terminal may be also used by other terminals. Therefore, in this situation, if the terminal receives a time alignment command from the base station, such received time alignment command has to be ignored.

Accordingly, the present invention may provide a method of handling a time alignment command during a random access procedure performed by a MAC layer in the LTE system. More particularly, according to the present invention, a terminal selectively applies an uplink synchronizing alignment command (i.e., TAC) according to a type of the random access procedure and/or a type of the random access preamble. For instance, if a time alignment command is received during a random access procedure, the terminal may determine a type of random access preamble that was transmitted to the network. If the transmitted random access preamble was selected and/or indicted by the base station and if the random access preamble is not random access preamble 0 (i.e., RAPID is not 00000), the terminal may adjust an uplink synchronization using the received time alignment command, and then may start or restart the timing alignment timer. In contrast, if the transmitted random access preamble was not selected by the base station, or if the transmitted random access preamble was selected by the base station but the random access preamble is equal to the random access preamble 0 (i.e., RAPID=00000), the terminal may not apply the received time alignment command.

The description of a time synchronization operation for an uplink transmission according to a first embodiment of the present invention will be given as following.

When the terminal (or User equipment) receives a timing advance command MAC (medium access control) element, the received timing advance command may be applied by the terminal. Namely, the terminal may stat the time alignment timer (TAT) (if the TAT is not running) or may restart the time alignment timer (if the TAT is already running).

When the terminal receives a timing advance command in a random access response message, if a random access preamble and physical random access channel (PRACH) resource were explicitly signaled except the case when the ordered random access preamble was 00000, then the terminal may apply the timing advance command, then the terminal may start the time alignment timer (if the TAT is no running) or may restart the time alignment timer (if the TAT is already running), if the random access preamble and PRACH resource were not explicitly signaled or the random access preamble and PRACH resource were explicit signaled and the ordered random access preamble was 00000, and if the time alignment timer is not running or has expired, then the terminal may apply the timing advance command, and may start the time alignment timer, when a contention resolution is considered not successfully, the terminal may stop the time alignment timer, in other case except for the above, the terminal may ignore the received timing advance command.

The above description of the time synchronization operation for the uplink transmission according to the first embodiment of the present invention can be represented by a following text procedure:

The UE Shall:
    when a Timing Advance Command MAC control element is received:
        apply the Timing Advance Command;
        start the Time Alignment Timer (if not running) or restart the Time Alignment Timer (if already running).
    when a Timing Advance Command is received in a Random Access Response message:
        if the Random Access Preamble and PRACH resource were explicitly signalled except the case when the ordered RA preamble was 00000:
            apply the Timing Advance Command;
            start the Time Alignment Timer (if not running) or restart the Time Alignment Timer (if already running).
        else, if the Time Alignment Timer is not running or has expired:
            apply the Timing Advance Command;
            start the Time Alignment Timer;
            when the contention resolution is considered not successful, stop the Time Alignment Timer.
        else:
            ignore the received Timing Advance Command.
    when the Time Alignment Timer has expired or is not running:
        prior to any UL-SCH transmission, use the Random Access procedure in order to obtain uplink Time Alignment.
    when the Time Alignment Timer expires:
        flush all HARQ buffers and consider the next transmission for each process as the very first transmission;
        notify RRC of PUCCH/SRS release;
    clear any configured downlink assignments and uplink grants.

The description of a time synchronization operation for an uplink transmission according to a second embodiment of the present invention will be given as following.

When terminal receives an explicit order from Network to start a random access procedure, the terminal starts a random access procedure. In this case, if the ordered random access preamble is equal to '00000', the terminal switches to contention based random access and the UE has to select one of the contention based random access preamble. Then, the terminal will transmit the selected random access preamble to network. In order words, if the order preamble is not '00000', the transmitted random access preamble is what has been signaled by network. And, if the order preamble Is '00000', the transmitted random access preamble is what has been selected by UE. Thus, that random access response were explicitly signaled and the signaled random access response is not '00000' means that the transmitted random access response is not selected by terminal. Thus, based on whether the actually transmitted random access preamble is selected by terminal, the terminal decides whether to apply the received timing advance command or not. In the transmitted random access preamble is selected by terminal, when the terminal (or User equipment) receives a timing advance command MAC (medium access control) element, the received timing advance command may be applied by the terminal. Namely, the terminal may stat the time alignment timer (TAT) (if the TAT is not running) or may restart the time alignment timer (if the TAT is already running).

When the terminal receives a timing advance command in a random access response message, if a random access preamble, which was transmitted by terminal, was not selected by a terminal (e.g., UE MAC), then the terminal may apply the timing advance command, then the terminal may start the time alignment timer (if the TAT is no running) or may restart the time alignment timer (if the TAT Is already running), if the random access preamble and PRACH resource were not explicitly signaled and if the time alignment timer is not running or has expired, then the terminal may apply the timing advance command, and may start the time alignment timer, when a contention resolution is considered not successfully, the terminal may stop the time alignment timer, in other case except for the above, the terminal may ignore the received timing advance command.

The above description of the time synchronization operation for the uplink transmission according to the second embodiment of the present invention can be represented by a following text procedure:

The UE Shall:
  when a Timing Advance Command MAC control element is received:
    apply the Timing Advance Command;
    start the Time Alignment Timer (if not running) or restart the Time Alignment Timer (if already running).
  when a Timing Advance Command is received in a Random Access Response message:
    if the Random Access Preamble was not selected by UE MAC:
      apply the Timing Advance Command;
      start the Time Alignment Timer (if not running) or restart the Time Alignment Timer (if already running).
    else, if the Time Alignment Timer is not running or has expired:
      apply the Timing Advance Command;
      start the Time Alignment Timer;
      when the contention resolution is considered not successful, stop the Time Alignment Timer.
    else:
      ignore the received Timing Advance Command.
  when the Time Alignment Timer has expired or is not running:
    prior to any UL-SCH transmission, use the Random Access procedure in order to obtain uplink Time Alignment.
  when the Time Alignment Timer expires:
    flush all HARQ buffers and consider the next transmission for each process as the very first transmission;
    notify RRC of PUCCH/SRS release;
    clear any configured downlink assignments and uplink grants.

Figure 6:
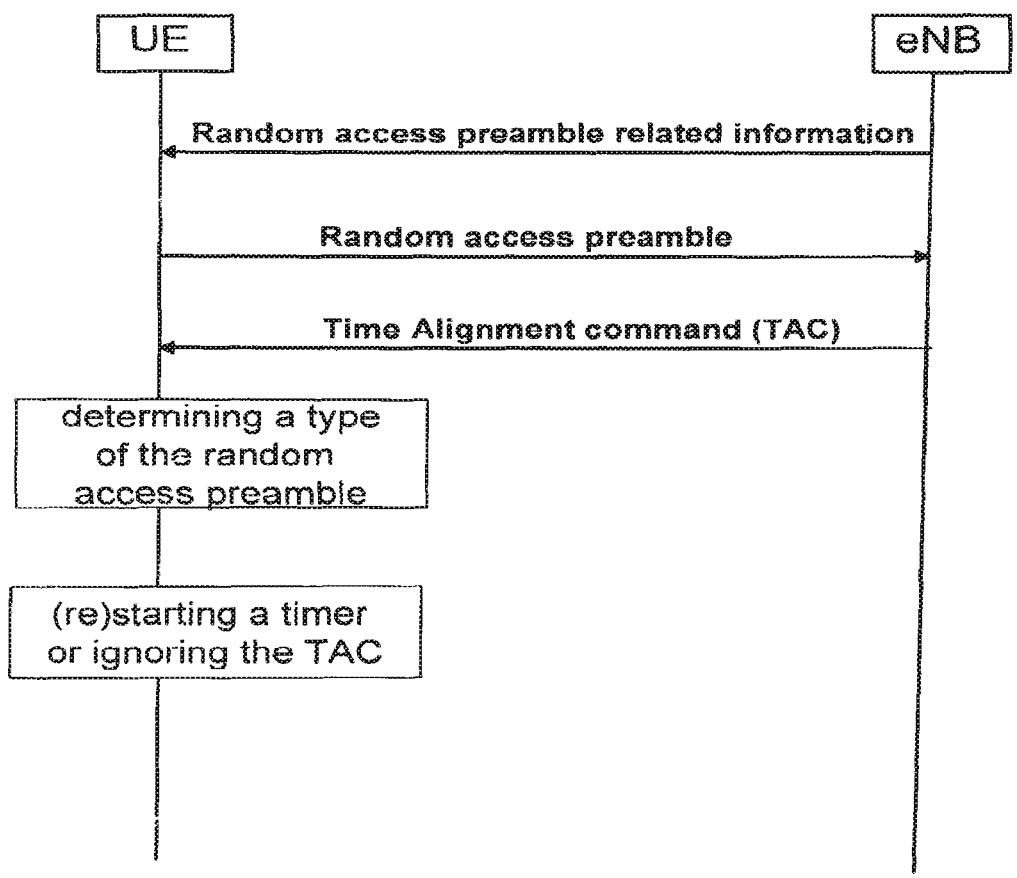
FIG. 6 shows an exemplary view of a time synchronization operation for an uplink transmission according to the present invention.

FIG. 6 shows an exemplary view of a time synchronization operation for an uplink transmission according to the present invention.

As illustrated in FIG. 6, a network (i.e., base station) may transmit random access preamble related information to a terminal. Here, the information relating to the random access preamble may indicate an identity of the random access preamble, or may Indicate an Index of the random access preamble. Here, the Index of the random access preamble may be referred as a 'ra-PreambleIndex'. Further, the index of the random access preamble may be related with a 'PRACH resource index', which is an index of a PRACH within a system frame, and a 'ra-PRACH-MaskIndex', which defines in which PRACHs within a system frame the UE can transmit a random access preamble. After the information related to the random access preamble is transmitted to the terminal, the terminal may transmit the random access preamble to the base station. Thereafter, a time alignment command (TAC) is transmitted from the base station. Here, the time alignment command may be used to start a timer such as a timing alignment timer (TAT). Once the time alignment command is received, the terminal may check a type of the transmitted random access preamble in order to determine whether the received time alignment command should be applied or not. For example, if the transmitted random access preamble is determined to be selected by the network, the received time alignment command is applied by the terminal to start or restart the timer. However, if the transmitted random access preamble is determined to be selected by the terminal, the received time alignment command is not applied by the terminal.

According to the present invention, an effective uplink synchronization command handling method has been provided. Namely, a stability of call by the terminal may be improved, a data loss or a delay of the data transmission may be minimized, and any signal interference(s) causing by an unnecessary uplink transmission of TAC may be prevented.

The present disclosure may provide a method of performing a random access procedure by a terminal in wireless communication system, the method comprising: receiving a command for starting a timer; determining whether a random access preamble transmitted in the random access procedure is not selected by a terminal; and starting or restating the timer if it is determined that the random access preamble is not selected by the terminal, wherein the received command is ignored if it is determined that the random access preamble is selected by the terminal, the command is a time alignment command (TAC), the command is received in a random access response message, and the timer is a time alignment timer (TAT).

It can be also said that the present disclosure may provide a method of performing a random access procedure by a terminal in wireless communication system, the method comprising: receiving information related to a random access preamble from a network; transmitting a random access preamble to the network; receiving a command for starting a timer; determining whether the random access preamble transmitted in the random access procedure is selected by a network; starting or restating the timer if it is determined that the random access preamble is selected by the network; determining whether the received information indicates a specific preamble identity; and selecting a random access preamble if it is determined that the received information indicates the specific preamble identity, wherein an index of the specific preamble identity is 00000, the received command is ignored if it is determined that the random access preamble is not selected by the network, the command is a time alignment command (TAC), the command is received in a random access response message, the timer is a time alignment timer (TAT), and the all of the steps are performed in a MAC layer.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A terminal for performing a random access procedure in wireless communication system, the terminal comprising:
   a transceiver adapted to receive a time advance command (TAC) for operating a time alignment timer (TAT) that is used to control how long the terminal is considered uplink time aligned,
   wherein the TAC is received in a random access response message;
   a processor adapted to determine whether a random access preamble to be used by the terminal in the random access procedure was not selected by the terminal;
   wherein if it is determined that the random access preamble was not selected by the terminal, the TAC is applied, and the TAT is started or restarted,
   wherein if it is determined that the random access preamble was selected by the terminal and if the TAT is not running, the TAC is applied, the TAT is started, and the TAT is stopped when a contention resolution is considered not successful; and
   wherein if it is determined that the random access preamble was selected by the terminal and if the TAT is running, the received TAC is ignored.

2. The terminal of claim 1, wherein the random access procedure is a non-contention based random access procedure if the random access preamble was not selected by the terminal.

3. The terminal of claim 2, wherein a one-to-one mapping is existed between the terminal and the random access preamble during the non-contention based random access procedure.

4. The terminal of claim 2, wherein a dedicated random access preamble is used in the non-contention based random access procedure.

5. The terminal of claim 1, wherein the random access procedure is a contention based random access procedure if the random access preamble was selected by the terminal.

6. The terminal of claim 5, wherein a one-to-N mapping is existed between the terminal and the random access preamble during the contention based random access procedure.

7. The terminal of claim 1, wherein the random access procedure is a non-contention based random access procedure if the random access preamble was explicitly signaled and an index of the random access preamble was not 00000.

8. The terminal of claim 7, wherein the index of the random access preamble is a 'ra-PreambleIndex', which is related with at least a 'PRACH resource index' that is an index of a PRACH within a system frame or a 'ra-PRACH-MaskIndex' defining in which PRACHs within a system frame the terminal can transmit the random access preamble.

9. The terminal of claim 1, wherein the random access procedure is a contention based random access procedure if the random access preamble was not explicitly signaled.

10. The terminal of claim 1, wherein a total number of random access preamble used in the random access procedure is 64, and some of the random access preambles are allocated for a non-contention based random access procedure and rest of the random access preambles are allocated for a contention based random access procedure.

11. The terminal of claim 1, wherein the TAC is ignored if the terminal switches to perform a non-contention based random access procedure from a contention based random access procedure.

* * * * *